US010906213B2

(12) United States Patent
Pucci et al.

(10) Patent No.: US 10,906,213 B2
(45) Date of Patent: Feb. 2, 2021

(54) APPARATUS AND METHOD FOR PROCESSING DOSES

(71) Applicant: SACMI COOPERATIVA MECCANICI IMOLA SOCIETA' COOPERATIVA, Imola (IT)

(72) Inventors: Fabrizio Pucci, Castel Guelfo di Bologna (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 15/767,011

(22) PCT Filed: Oct. 7, 2016

(86) PCT No.: PCT/IB2016/056007
§ 371 (c)(1),
(2) Date: Apr. 9, 2018

(87) PCT Pub. No.: WO2017/064601
PCT Pub. Date: Apr. 20, 2017

(65) Prior Publication Data
US 2018/0297246 A1 Oct. 18, 2018

(30) Foreign Application Priority Data

Oct. 14, 2015 (IT) .................. 102015000061419

(51) Int. Cl.
*B29C 43/34* (2006.01)
*B29C 48/00* (2019.01)
(Continued)

(52) U.S. Cl.
CPC ............ *B29C 43/34* (2013.01); *B29C 31/048* (2013.01); *B29C 31/06* (2013.01); *B29C 43/203* (2013.01);
(Continued)

(58) Field of Classification Search
CPC ..... B29C 31/004; B29C 31/048; B29C 31/06; B29C 31/065; B29C 43/34; B29C 43/06;
(Continued)

(56) References Cited

U.S. PATENT DOCUMENTS 4,080,136 A * 3/1978 Peller ...................... B26D 7/18
425/295
6,186,765 B1 2/2001 Ide et al.
(Continued)

FOREIGN PATENT DOCUMENTS

CN 100488763 C 5/2010
CN 101905504 A 12/2010
(Continued)

*Primary Examiner* — Anthony Calandra
*Assistant Examiner* — Eric T Chen
(74) *Attorney, Agent, or Firm* — Pearne & Gordon LLP (57) ABSTRACT

An apparatus including a co-extrusion device for extruding a multi-layer structure having at least one primary layer and at least one secondary layer, so that the multi-layer structure leaves the co-extrusion device along an exit direction; a mould provided with a pair of elements, at least one of the elements being movable towards the other in a moulding direction, so as to compression mould an object from a multi-layer dose which was severed from the multi-layer structure; a transport device for carrying the dose towards the mould; an arrangement for modifying orientation of the dose while the dose is being transported by the transport device, so that the dose is introduced into the mould with an orientation in which the secondary layer extends transversely to the moulding direction.

13 Claims, 4 Drawing Sheets

(51) Int. Cl.
  *B29C 48/21* (2019.01)
  *B29C 31/04* (2006.01)
  *B29C 31/06* (2006.01)
  *B29C 43/20* (2006.01)
  *B29C 43/08* (2006.01)
  *B29K 101/12* (2006.01)
  *B29L 31/56* (2006.01)

(52) U.S. Cl.
  CPC .......... *B29C 48/0011* (2019.02); *B29C 48/21* (2019.02); *B29C 43/08* (2013.01); *B29C 2043/3411* (2013.01); *B29C 2043/3466* (2013.01); *B29C 2043/3472* (2013.01); *B29K 2101/12* (2013.01); *B29K 2995/0067* (2013.01); *B29L 2031/565* (2013.01)

(58) Field of Classification Search
  CPC ..... B29C 2043/3405; B29C 2043/3411; B29C 2043/3433; B29C 2043/3466; B29C 2043/3472; B29C 31/04; B30B 15/30; B30B 15/302
  USPC .................................. 425/256, 261
  See application file for complete search history.

(56) References Cited

U.S. PATENT DOCUMENTS

| | | |
|---|---|---|
| 7,247,014 B2 | 7/2007 | Mattice et al. |
| 8,246,890 B2 | 8/2012 | Thomasset |
| 2001/0011782 A1 | 8/2001 | Ide et al. |
| 2003/0038402 A1 | 2/2003 | Visconti et al. |
| 2003/0198708 A1 | 10/2003 | Pucci |
| 2004/0061252 A1 | 4/2004 | Ide et al. |
| 2004/0150126 A1 | 8/2004 | Ide et al. |
| 2006/0286192 A1 | 12/2006 | Mattice et al. |
| 2007/0018355 A1* | 1/2007 | Steele .................. B29C 31/048 264/297.3 |
| 2008/0284058 A1 | 11/2008 | Thomasset |
| 2009/0014915 A1 | 1/2009 | Asano et al. |
| 2010/0047542 A1 | 2/2010 | Thomasset |
| 2015/0197039 A1* | 7/2015 | Matsuzuki ............ C03B 11/122 264/297.7 |

FOREIGN PATENT DOCUMENTS

| | | |
|---|---|---|
| CN | 103522476 A | 1/2014 |
| CN | 204076625 U | 1/2015 |
| EP | 1757421 A1 | 2/2007 |
| EP | 1955835 A1 | 8/2008 |
| JP | H11198159 A | 7/1999 |
| JP | 2007216531 | 8/2007 |
| JP | 2010517822 A | 5/2010 |
| WO | 2005039853 A2 | 5/2005 |
| WO | 2006138089 A1 | 12/2006 |
| WO | 2007094518 A1 | 8/2007 |
| WO | 2009083855 A2 | 7/2009 |
| WO | 2014051014 A1 | 4/2014 |

\* cited by examiner

APPARATUS AND METHOD FOR PROCESSING DOSES

The invention concerns an apparatus and a method for processing doses, in particular multi-layer doses, for the purpose of obtaining objects made of polymeric material through compression moulding.

Objects made of polymeric material are known, which are provided with a multi-layer structure, and in particular comprise a barrier material layer interposed between two layers of primary material. The barrier material may have barrier properties against oxygen, gases, aromas and/or light, while the primary material provides the object with the desired mechanical and aesthetic properties. Objects made of multi-layer material may be obtained by compression moulding a dose of polymeric material which also has a multi-layer structure. In particular, the dose of polymeric material may be conformed as a laminar element having a substantially flat barrier layer, interposed between two external layers which are also substantially flat.

Apparatuses are known for obtaining, through compression moulding, objects made of a single polymeric material, i.e. without a multi-layer structure. Such apparatuses comprise an extrusion device for extruding the polymeric material along a substantially vertical extrusion direction. A transport carousel is also provided, equipped with a plurality of transport elements, each of which is adapted to sever a dose of polymeric material leaving the extrusion device and to transport the dose towards a mould. The latter comprises a female mould element, equipped with a cavity into which the transport element releases the dose, and a male mould element, cooperating with the female mould element for shaping the dose until the desired object is obtained. The female mould element and the male mould element are movable with respect to one another along a substantially vertical moulding direction.

Apparatuses of the known type described above do not allow multi-layer doses conformed as laminar elements to be processed in an optimal way. If the apparatuses of the type described above were used for processing doses conformed as multi-layer laminar elements, the doses exiting the extrusion device would have a barrier layer which, at the exit from the extrusion device, is arranged on a substantially vertical plane. The doses released into the cavity of the female mould element would still have the barrier layer positioned on a substantially vertical plane, i.e. parallel to the moulding direction, which would not allow the material forming the barrier layer to flow correctly between the male element and the female element of the mould. This would make it almost impossible to uniformly distribute the material forming the barrier layer in the walls of the object to be obtained.

Consequently, the final object would have non-uniform barrier properties and, in particular, could have zones in which the barrier layer is absent or is too thin for adequately performing its function.

Multi-layer doses are also known having a substantially cylindrical shape, wherein the barrier material is shaped like a hollow cylinder buried in the primary material. The multi-layer doses of this type are particularly problematic for compression moulding, both because it is difficult to position them correctly in the cavity of the female mould element, and because the barrier material tends to get distributed non-uniformly within the mould. In the worst cases, the barrier material may be absent in some areas of the formed object, and form a double layer in other zones of such object.

Regardless of whether the dose has a multi-layer or single-layer structure, it may also be complicated, for the material constituting the dose, to rise into the space defined between the female mould element and the male mould element for forming a lateral wall of the object to be obtained.

An object of the invention is to improve the apparatuses and methods for obtaining compression moulded multi-layer objects.

A further object is to provide an apparatus and a method for compression moulding multi-layer doses having at least one primary layer and at least one secondary layer, which allow objects to be obtained inside which the secondary layer is distributed relatively uniformly.

A further object is to provide a method and an apparatus for compression moulding multi-layer doses having at least one primary layer and at least one secondary layer, which allow the material forming the secondary layer to flow into a mould as uniformly as possible.

Another object is to provide a method and an apparatus for obtaining an object through the compression moulding of a dose, which allows the filling of the mould by the material constituting the dose to be improved and, should the latter have a multi-layer structure, also the distribution of the secondary layer in a lateral wall of the object to be improved.

Yet another object is to improve the positioning in a mould of a dose, whether it is multi-layer or single layer.

In a first aspect of the invention, an apparatus is envisaged comprising:
- a co-extrusion device for extruding a multi-layer structure having at least one primary layer and at least one secondary layer, so that the multi-layer structure leaves the co-extrusion device along an exit direction;
- a mould provided with a pair of elements, at least one of said elements being movable towards the other in a moulding direction, so as to compression mould an object from a multi-layer dose which was severed from the multi-layer structure;
- a transport device for carrying the multi-layer dose towards the mould;
- an arrangement for modifying orientation of the multi-layer dose while the multi-layer dose is being transported by the transport device, so that the multi-layer dose is introduced into the mould with an orientation in which the secondary layer extends transversely to the moulding direction.

The arrangement for modifying the orientation of the dose allows the orientation of the dose to be modified from an initial orientation, which the dose had when it was severed from the multi-layer structure, and which could for example be parallel to the moulding direction, to an orientation in which the secondary layer is arranged transversally, in particular perpendicularly, to the moulding direction. This allows the secondary layer to flow relatively uniformly into the mould during the compression moulding, in particular if the mould is configured to form an object having a wall arranged transversally to the moulding direction, such as in the case of a cap, a container or a gasket.

In this case, the dose is positioned in the mould with an orientation in which the secondary layer is already on a plane almost coinciding with a plane in which the secondary layer will be arranged in the finished object. This ensures that the secondary layer is spread uniformly between the pair of mould elements. Consequently, when pressed between the mould elements, the secondary layer easily occupies almost all the wall of the object arranged transversally to the moulding direction, so that such wall has the properties granted to the secondary layer practically across its whole extension. Furthermore, the flow of material forming the secondary layer is optimised in a mould portion intended to create a lateral wall of the object.

Finally, during compression moulding, the secondary layer does not suffer any excessive deformations, which could compromise its integrity or continuity. Thus, it is possible to obtain an object inside which the properties granted to the secondary layer are uniformly distributed.

In a second aspect of the invention, a method is envisaged comprising the steps of:
  extruding a multi-layer structure having at least one primary layer and at least one secondary layer;
  severing a multi-layer dose from the multi-layer structure;
  compression moulding an object from a multi-layer dose severed from the multi-layer structure, the step of compression moulding occurring in a mould provided with a pair of elements, at least one of said elements being movable towards the other in a moulding direction, so as to shape the multi-layer dose;
wherein the multi-layer dose has an initial orientation at the end of the extrusion step, the orientation of the multi-layer dose being modified while the multi-layer dose is being transported towards the mould, so that the multi-layer dose is introduced into the mould with an orientation in which the secondary layer extends transversely to the moulding direction.

The method in accordance with a second aspect of the invention allows objects to be obtained by compression moulding a multi-layer dose, wherein the material that forms the secondary layer is distributed relatively uniformly, as will be more widely discussed with reference to the apparatus according to the first aspect of the invention.

In a third aspect of the invention, an apparatus is envisaged comprising:
  a dispensing device having an exit mouth which is conformed as a slit, for dispensing a continuous flat structure from which a laminar dose can be severed, so that the continuous flat structure leaves the dispensing device along an exit direction;
  a mould provided with a pair of elements, at least one of said elements being movable towards the other in a moulding direction, so as to compression mould an object from the laminar dose;
  a transport device for carrying the laminar dose towards the mould;
  an arrangement for modifying the orientation of the laminar dose while the laminar dose is being transported by the transport device, so that the laminar dose is introduced into the mould while the laminar dose is lying on a plane arranged transversely to the moulding direction.

In a fourth aspect of the invention, a method is envisaged comprising the steps of:
  extruding a continuous flat structure;
  severing a laminar dose from the continuous flat structure;
  compression moulding an object from a laminar dose, the step of compression moulding occurring in a mould provided with a pair of elements, at least one of said elements being movable towards the other in a moulding direction, so as to shape the laminar dose;
wherein the laminar dose has an initial orientation at the end of the extrusion step, the orientation of the laminar dose being modified while the laminar dose is being transported towards the mould, so that the laminar dose is introduced into the mould while the laminar dose is lying on a plane arranged transversely to the moulding direction.

Thanks to the third and fourth aspect of the invention, the dose can be inserted in a stable way into the mould, which allows any undesired movements of the dose to be limited, or even eliminated, after the latter has been introduced into the mould. Thus, the filling of the mould is optimised and any defects that could arise on the finished object, due to incorrect positioning of the dose between the mould elements, are reduced.

The invention can be better understood and actuated with reference to the accompanying figures of the drawings, which illustrate a non-limiting embodiment thereof, in which.

Figure 1:
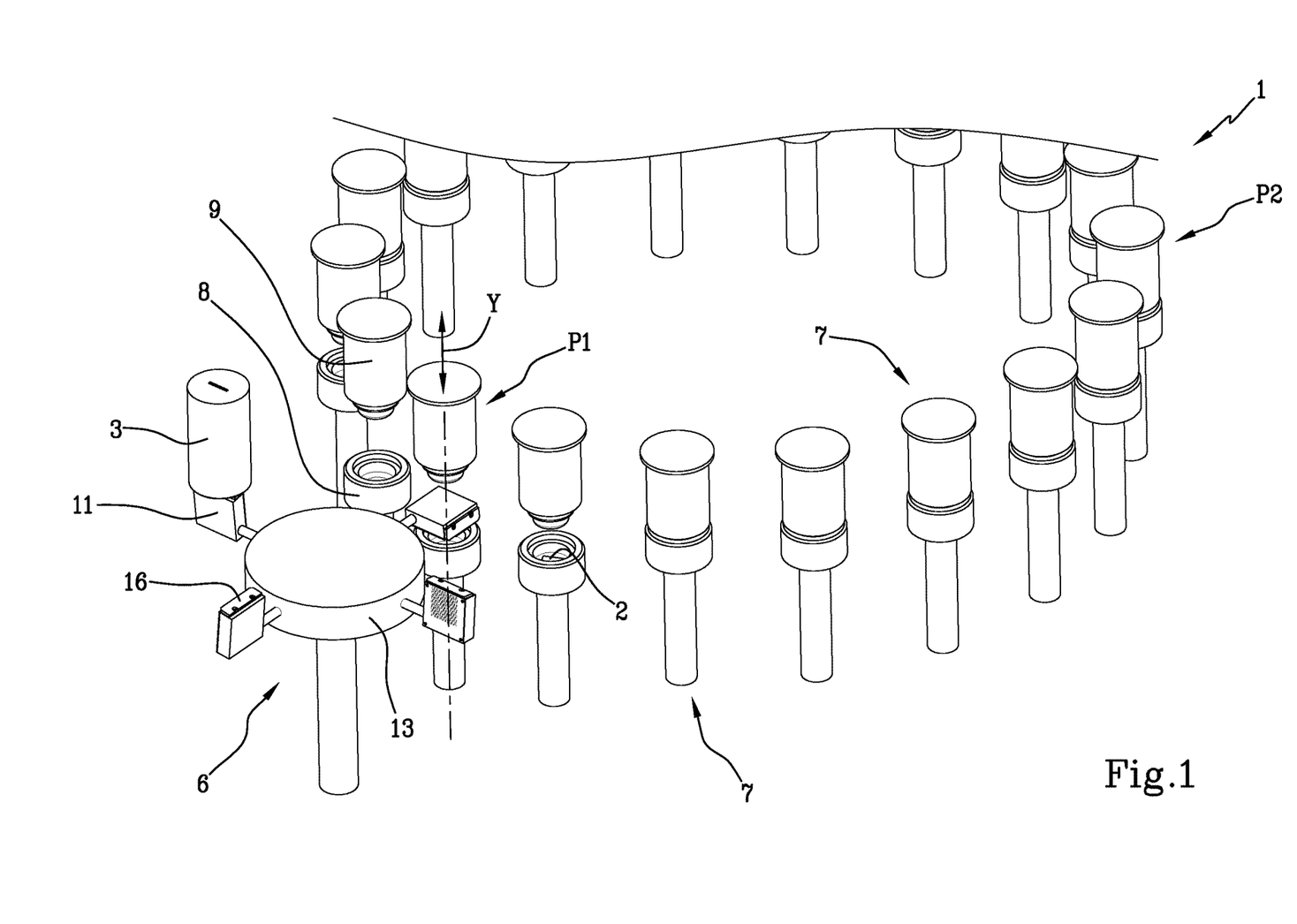
FIG. 1 is a schematic perspective view showing an apparatus for obtaining objects by compression moulding multi-layer doses.

FIG. 1 shows an apparatus 1 for obtaining objects by compression moulding multi-layer doses 2. The objects that the apparatus 1 is able to produce may be, in particular, caps for containers, gaskets or containers.

The apparatus 1 comprises a dispensing device conformed in particular as a co-extrusion device 3, for dispensing a continuous structure, in particular conformed as a multi-layer structure comprising a plurality of polymeric materials. The co-extrusion device 3 may be equipped with an exit mouth which is conformed as a slit, particularly but not exclusively having a rectilinear or substantially rectilinear geometry, so as to extrude a flat multi-layer structure from which multi-layer doses 2 conformed as laminar elements can be severed. The multi-layer doses 2 thus obtained extend prevalently in a main plane and have two larger dimensions in such main plane, and a thickness, lower than the aforementioned two larger dimensions, in a perpendicular direction to the main plane. The multi-layer doses 2 thus obtained therefore have a parallelepiped shape with a lower height than the linear dimensions of the base.

Figure 3:
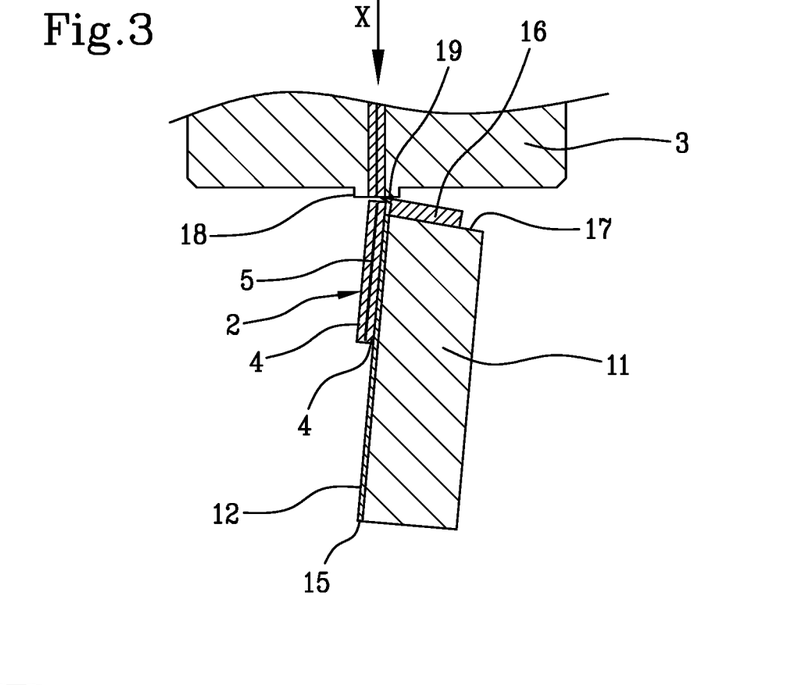
FIG. 3 is a sectional, schematic and enlarged view, showing a co-extrusion device, a severing element and a transport element of the apparatus in FIG. 1.

As shown in FIG. 3, each multi-layer dose 2 comprises at least one primary layer 4 and at least one secondary layer 5.

The secondary layer 5 is parallel to the aforementioned main plane.

In the example shown, the multi-layer dose 2 comprises two primary layers 4, made with the same material, and a secondary layer 5 interposed between the two primary layers 4. It is therefore possible to provide a larger number of layers of the multi-layer dose 2 than three, and/or a case in which the secondary layer 5 is interposed between two or more external layers made with materials that are different from one another.

The secondary layer 5 may have, in plan view, the same linear dimensions as the primary layer 4, so as to appear outside the multi-layer dose 2. Alternatively, the secondary layer 5 may have, in plan view, lower linear dimensions than the primary layer 4, along one or both of the directions definable on the multi-layer dose 2 parallel to the main plane.

The primary layer 4 may be made with a polymeric material able to give the finished object the desired mechanical and aesthetic properties, for example a thermoplastic polymer, e.g. polyethylene terephthalate (PET), polypropylene (PP), polyvinylchloride (PVC), polyethylene (PE), polyethylene naphthalate (PEN), polystyrene (PS) or polylactic acid (PLA), or the like. The secondary layer 5 may instead be made with a barrier material, equipped with barrier properties against oxygen, and/or gases, and/or aromas, and/or humidity, and/or light. The barrier material may for example comprise an ethylene-vinyl alcohol copolymer (EVOH), or an aromatic polyamide NMXD6, or the like. Alternatively, the secondary layer 5 may be made with any recycled plastic material, or with a material of the same type of material that forms the primary layer 4 with one or more dyes added adapted to provide light barrier properties, e.g. black, or with an oxygen scavenger added.

The co-extrusion device 3 is positioned such that the multi-layer structure leaves the co-extrusion device 3 in an exit direction X, which in the example shown is vertical.

The apparatus 1 further comprises at least one mould 7 for receiving the multi-layer dose 2 and shaping the multi-layer dose 2 so as to obtain the desired object therefrom. The mould 7 comprises a female element 8 and a male element 9, at least one of which is movable with respect to the other along a moulding direction Y, in order to shape the multi-layer dose 2. In the example shown, the apparatus 1 comprises a movement device (not shown) for moving the female element 8 along the moulding direction Y, so as to move the female element 8 nearer to, and alternatively move the female element 8 away from, the male element 9. Alternatively, the movement device may move the male element 9 along the moulding direction Y, while the female element 8 is kept stationary along said direction. It is also possible for the movement device to simultaneously move both the female element 8 and the male element 9 along the moulding direction Y, so as to move them closer to or alternatively further away from one another. In the example shown, the moulding direction Y is vertical.

In any case, the movement device moves the female element 8 and the male element 9 with respect to one another between an open position P1 and a closed position P2. In the open position P1, the female element 8 and the male element 9 are spaced out from one another, so that it is possible to remove a formed object from the mould 7 and introduce a multi-layer dose 2 into the mould 7 intended to form a new object. In the closed position P2, between the female element 8 and the male element 9 a forming chamber is defined having a shape corresponding to the shape of the object to be obtained.

Figure 2:
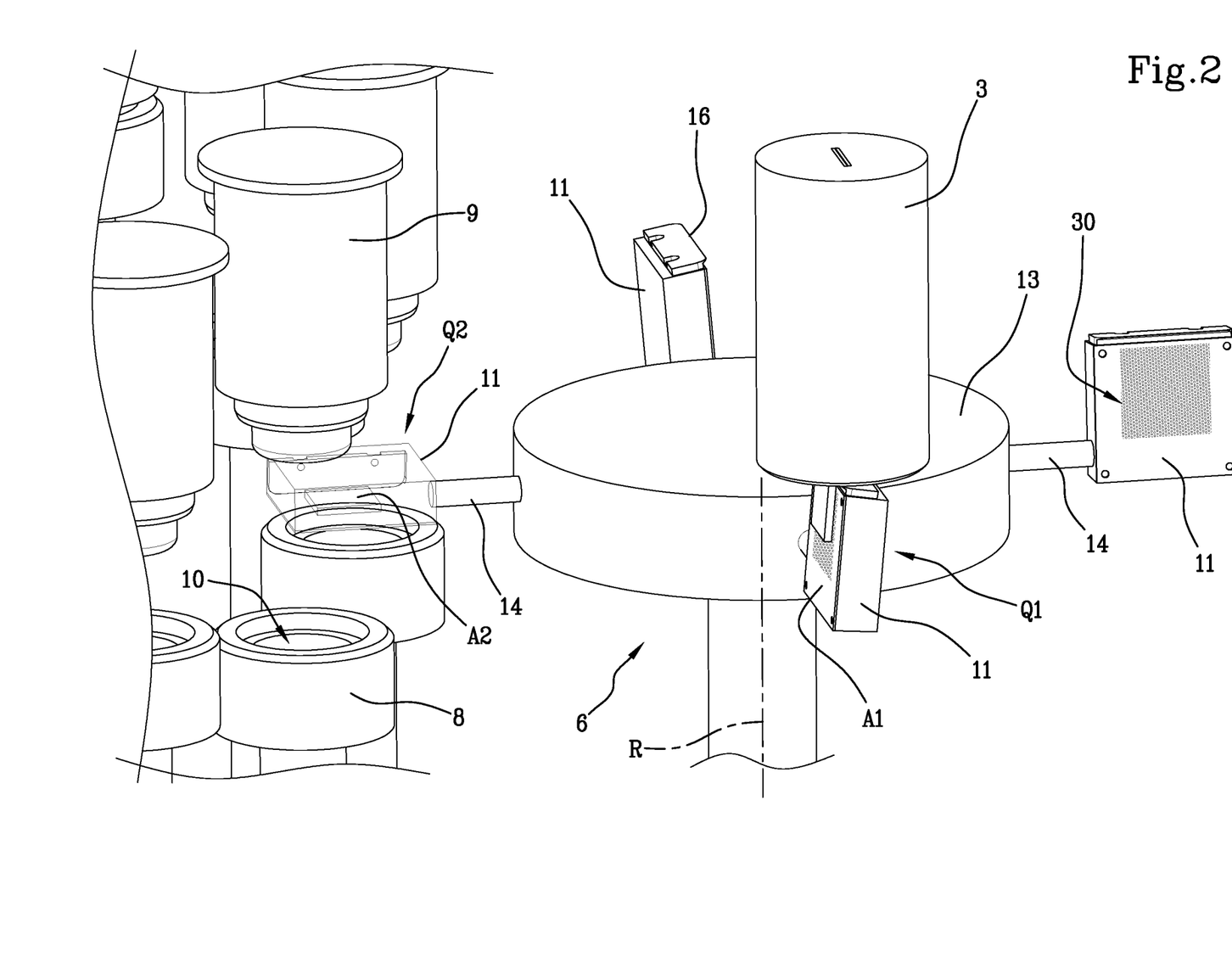
FIG. 2 is a schematic perspective and enlarged view, in which some parts are drawn in transparency, showing a transport device of the apparatus in FIG. 1.

The female element 8 is provided with a cavity 10, shown in FIG. 2, adapted to receive the multi-layer dose 2, while the male element 9 is conformed as a punch which can penetrate into the cavity 10 for shaping the multi-layer dose 2.

In the example shown, the apparatus 1 comprises a plurality of moulds 7, arranged in a peripheric region of a moulding carousel (not shown), rotatable about an axis, for example, vertical, in particular in a continuous way.

The apparatus 1 further comprises a transport device 6, shown in FIGS. 1 and 2, for transporting the multi-layer dose 2 from the co-extrusion device 3 towards the mould 7. The transport device 6 may comprise a plurality of transport elements 11, each of which is adapted to transport a multi-layer dose 2.

The transport device 6 may be rotatable about a rotation axis R, for example vertical. In particular, the transport device 6 may be conformed as a carousel. In the example shown, the rotation axis R is parallel to the exit direction X.

The transport device 6 may comprise a central body 13, rotatable about the rotation axis R, which supports the transport elements 11. In the example shown, the central body 13 is equipped with a plurality of arms 14, to each of which a corresponding transport element 11 is connected.

The arms 14 may extend radially about the rotation axis R. The arms 14 may be equidistant about the rotation axis R.

In the example shown, four arms 14 are provided, but it is naturally also possible to adopt a different number of arms 14 from four.

The transport device 6 is configured to move the multi-layer doses 2 along a direct path from the co-extrusion device 3 towards the mould 7. In particular, the transport device 6 is configured to move the transport elements 11 in a plurality of operating positions, which comprise a collecting position Q1 and a release position Q2, shown for example in FIG. 1. In the collecting position Q1, a transport element 11 collects a multi-layer dose 2 which is severed from the multi-layer structure that leaves the co-extrusion device 3. In the release position Q2, the transport element 11 is interposed between a female element 8 and the corresponding male element 9 of a mould 7, which is in the open position P1. The multi-layer dose 2 may be released into the cavity 10 of the female element 8.

Each transport element 11 comprises a transport surface 12, shown in FIG. 3, adapted to come into contact with the multi-layer dose 2 while the latter is transported from the co-extrusion device 3 towards the mould 7. In particular, the multi-layer dose 2 adheres to the transport surface 12 during the path from the collecting position Q1 to the release position Q2.

The apparatus 1 further comprises an arrangement for modifying the orientation for rotating each transport element 11 during the path from the collecting position Q1 to the release position Q2. The arrangement for modifying the orientation allows the orientation of the multi-layer dose 2 that the transport element 11 moves to be modified from an initial orientation which the multi-layer dose 2 has in the collecting position Q1 to a final orientation which the multi-layer dose 2 has in the release position Q2. When the multi-layer dose 2 is in the final orientation, the secondary layer 5 is arranged transversally with respect to the moulding direction Y. More in particular, in the final orientation, the secondary layer 5 is arranged perpendicularly to the moulding direction Y.

When the multi-layer dose 2 is arranged in the final orientation, the multi-layer dose 2 identifies a main plane which, in the example shown, is transversal, in particular perpendicular, to the moulding direction Y. In the final orientation, the main plane of the multi-layer dose 2 is substantially perpendicular to the plane identified by the multi-layer dose 2 in the initial orientation. In particular, in the example shown the multi-layer dose 2 is lying, in the initial orientation, on a substantially vertical plane, while it is lying on a horizontal plane in the final orientation. The term "substantially vertical" used with reference to the position of the multi-layer dose 2 according to the initial orientation, means a position that could be vertical or even deviate by a few degrees from the vertical position. In fact, the arrangement for modifying the orientation is configured so that, in the collecting position Q1, the transport surface 12 is inclined backwards by a few degrees, e.g. less than 5°, with respect to the vertical direction. This makes it easier for the multi-layer dose 2, just severed from the multi-layer structure leaving the co-extrusion device 3, to adhere to the transport surface 12.

In the initial orientation, the multi-layer dose 2 is arranged parallel, or almost, to the exit direction X. In other words, according to the initial orientation, the secondary layer 5, which is lying on the main plane of the multi-layer dose 2, is substantially parallel to the exit direction X.

The arrangement for modifying the orientation allows the orientation of the multi-layer dose 2 to be modified, by rotating the corresponding transport element 11 about an axis which, in the example shown, coincides with an axis of the arm 14 which supports the transport element 11 in question. More generally, the arrangement for modifying the orientation allows each transport element 11 to be rotated about a direct axis radially about the rotation axis R, and lying in particular on a perpendicular plane to the rotation axis R. In this way, the arrangement for modifying the orientation allows the transport surface 12 to be rotated by a pre-fixed angle while the transport element 11 moves from the collecting position Q1 to the release position Q2 and, therefore, to rotate the multi-layer dose 2, which adheres to the transport surface 12, by the same pre-fixed angle.

In the example shown, the arrangement for modifying the orientation is configured for rotating each transport element 11 by about 90° during the path that goes from the collecting position Q1 to the release position Q2. During the rest of the rotation stroke that each transport element 11 performs about the rotation axis R after releasing the multi-layer dose 2 into the cavity 10, each transport element 11 is rotated so as to return into the position in which it was found initially, in order to be ready to receive a multi-layer dose 2 arranged according to the initial orientation in the collecting position Q1.

Figure 5:
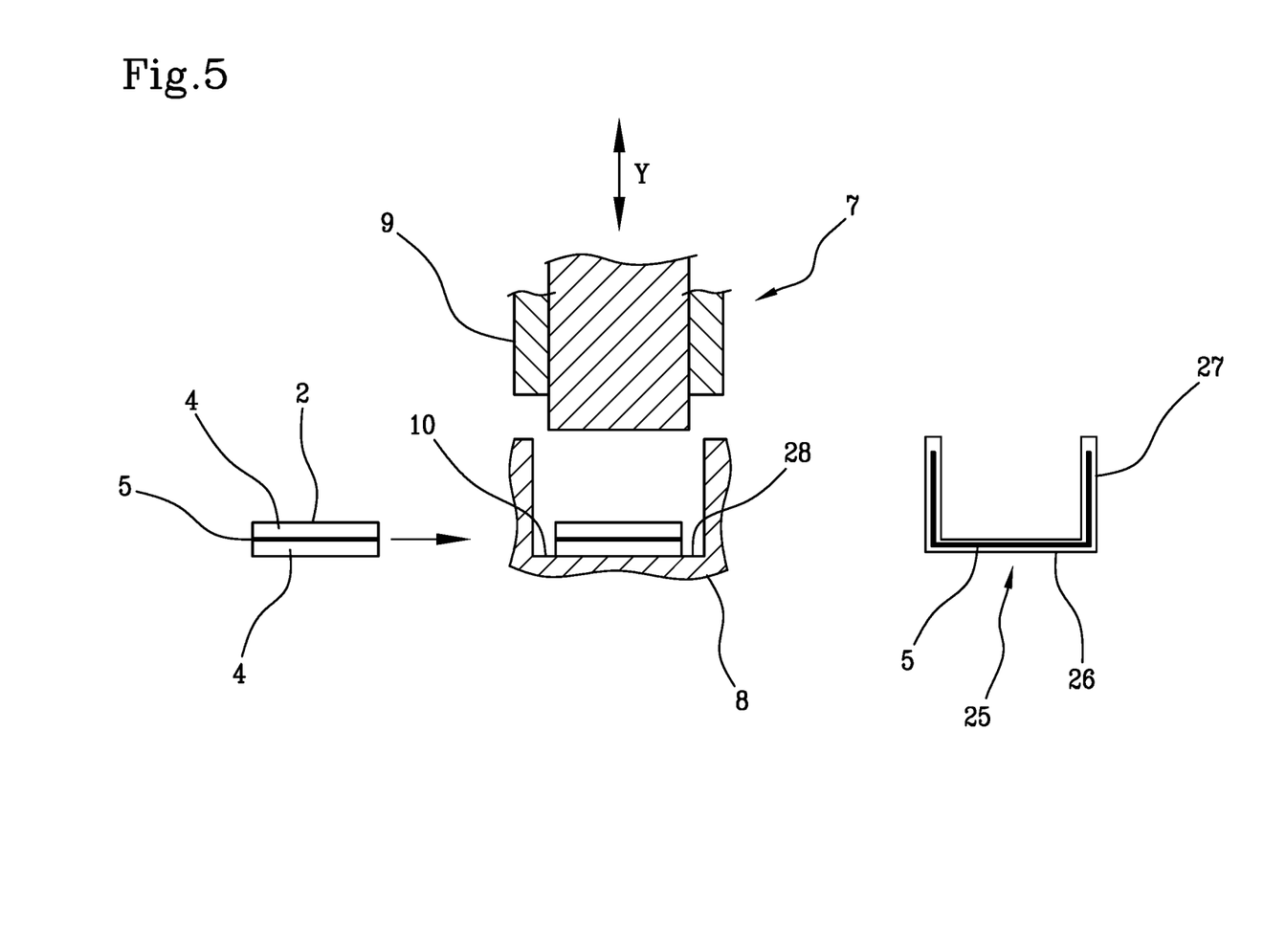
FIG. 5 is a schematic sectional view, showing some steps of the moulding of a multi-layer dose.

Thanks to the arrangement for modifying the orientation, the multi-layer dose 2 is introduced into the cavity 10 according to an orientation which, as shown in FIG. 5, is approximately parallel to a bottom surface 28 of the cavity 10, or more generally to a surface that delimits the cavity 10 transversally, in particular perpendicularly, to the moulding direction Y. This allows the multi-layer dose 2 to flow more uniformly between the female mould element 8 and the male mould element 9, so that the material forming the secondary layer 5 also reaches the points furthest from the forming chamber. This effect is particularly marked when objects are to be formed having a portion with a significant volume that extends transversally, in particular perpendicularly, to the moulding direction Y. This happens for example in the case in which the object to be formed is, as shown in FIG. 5, a cap 25 having an end wall 26 perpendicular to the moulding direction Y and a lateral wall 27 that extends about the moulding axis Y. By rotating the multi-layer dose 2, during transport, towards the mould 7, so that the multi-layer dose 2 is inserted into the cavity 10 with an orientation in which the secondary layer 5 is perpendicular to the moulding direction Y, it is possible to arrange the secondary layer 5 in the same orientation that it will have in the end wall 26 of the cap, so that the secondary layer 5 extends along the whole of the end wall 26. In this way the properties conferred to the secondary layer 5, for example, gas barrier properties, will be guaranteed on the whole of the end wall 26 of the cap.

Furthermore, thanks to its laminar conformation, the multi-layer dose 2 may be easily transported by the transport element 11, and firmly inserted into the cavity 10. This allows the dose to be positioned centrally with respect to the female element 8, and to minimise undesired movements of the multi-layer dose 2 within the cavity 10. The material that constitutes the multi-layer dose 2 can thus flow uniformly also along the portions of the mould intended to form the lateral wall 27, so that also that wall has good barrier properties.

Similar reasoning is also applicable in the case in which the object to be obtained is a gasket, which extends perpendicularly to the moulding direction Y, or a container equipped with a relatively wide bottom wall, or lateral walls that are relatively not very inclined.

More generally, the apparatus 1 described above, and the related operating method, allow an excellent distribution of the layer of secondary material to be obtained on a wall of the finished object arranged transversally to the moulding direction Y, for example a bottom wall, and better distribution of the layer of secondary material on a wall of the finished object arranged along the moulding direction Y, for example a lateral wall, with respect to known methods.

The arrangement for modifying the orientation may comprise any device, for example activated mechanically, pneumatically, electrically or hydraulically, which is adapted to rotate the transport element 11 during its path about the rotation axis R.

Figure 4:
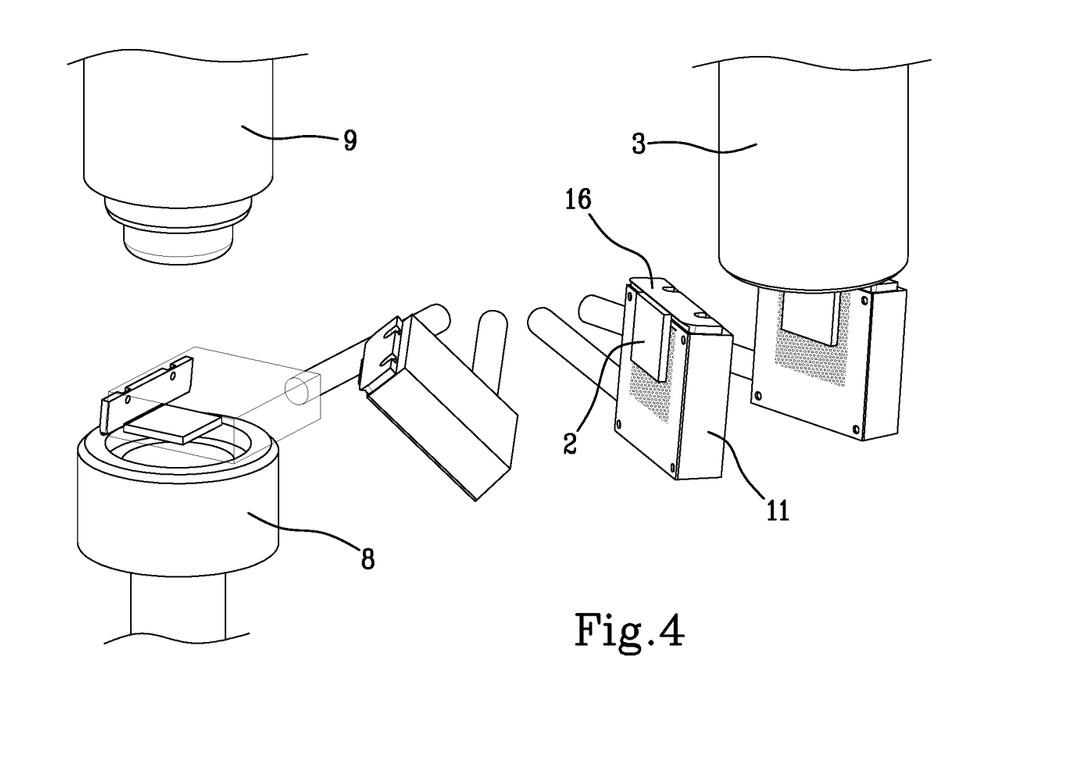
FIG. 4 is a perspective and schematic view, in which some parts are drawn in transparency, and in which the transport element of FIG. 3 is shown in a plurality of operating positions.

The arrangement for modifying the orientation is configured to maintain the transport surface 12, and therefore also the multi-layer dose 2, in a substantially vertical configuration, which may coincide with the initial orientation of the multi-layer dose 2, for a significant portion of the path that goes from the collecting position Q1 to the release position Q2. In particular, as shown in FIG. 4, the arrangement for modifying the orientation is configured to maintain the multi-layer dose 2 in a substantially vertical configuration along a portion equal to at least half, or even more, of the path that goes from the collecting position Q1 to the release position Q2. In other words, the multi-layer dose 2 is rotated from the initial orientation to the final orientation in the second half of the path that goes from the collecting position Q1 to the release position Q2. This allows deformations of the multi-layer dose 2 to be minimised or even prevented, said deformations being connected with the fact that the multi-layer dose 2 is transported while it is arranged horizontally and facing downwards.

As shown in FIG. 2, the transport surface 12 has a higher area A1 than the area A2 of a face of the multi-layer dose 2 intended to come into contact with the transport surface 12, during the path from the collecting position Q1 to the release position Q2. In this way, the whole face of the multi-layer dose 2 facing the transport surface 12 is supported by the transport surface 12 along the path from the collecting position Q1 to the release position Q2. This prevents excessive deformations of the multi-layer dose 2 at the exit from the co-extrusion device 3 and during the transport of the multi-layer dose 2. In particular, it prevents the multi-layer dose 2, after leaving the co-extrusion device 3, swelling and becoming arranged according to a rounded conformation, losing its initial laminar conformation.

In the example shown, the transport surface 12 is flat, like the face of the multi-layer dose 2 with which it is intended to come into contact. This allows the face of the multi-layer dose 2 resting on the transport surface 12 not to be deformed, also minimising deformations of the whole multi-layer dose 2. More generally, the transport surface 12 is shaped in a complementary way to the shape of the surface of the multi-layer dose 2 with which it is intended to interact.

To prevent the multi-layer dose 2 coming detached prematurely from the transport surface 12, the latter may be provided with a suction device 30, configured to keep the dose in contact with the transport surface 12 during the path that goes from the collecting position Q1 to the release position Q2.

The transport element 11 may comprise a blowing device (not shown) to generate, when desired, a jet of compressed air on the transport surface 12, so that the multi-layer dose 2 comes detached more easily from the transport surface 12 in the release position Q2.

To allow the multi-layer dose 2 to come detached more easily from the transport surface 12 in the release position Q2, the transport surface 12 may be afforded on a non-stick layer 15, shown in FIG. 3, fixed to the transport element 11.

In the example shown, each transport element 11 is conformed as a shovel.

The apparatus 1 further comprises a severing arrangement for severing the multi-layer doses 2 from the multi-layer structure leaving the co-extrusion device 3. In the example shown, the severing arrangement comprises a plurality of severing elements 16, each of which is fixed to a corresponding transport element 11.

More in detail, the severing elements 16 are fixed to respective upper regions, particularly to respective flat upper surfaces 17, of the corresponding transport elements 11.

The severing elements 16 may be conformed as blades, particularly flat.

Each severing element 16 is provided with a front cutting edge 19 which, during the path of the severing element 16, passes into an adjacent position to an exit mouth 18 of the co-extrusion device 3, almost in contact with the exit mouth 18, to sever a multi-layer dose 2 from it. The cutting edge 19 of each severing element 16 is arranged in a slightly more advanced position, with respect to the movement direction of the transport elements 11, of the corresponding transport surface 12, or flush with the latter. In this way, the multi-layer dose 2 adheres to the transport surface 12 as soon as the multi-layer dose 2 has been cut, or even during the cut.

During operation, a continuous multi-layer structure laves the co-extrusion device 3 along the exit direction X. The transport device 6 rotates about the rotation axis R so that the transport elements 11 pass, successively, in proximity to the exit mouth 18 of the co-extrusion device 3, particularly below the exit mouth 18.

While it rotates about the rotation axis R, each transport element 11 reaches the collecting position Q1 in which it interacts with the co-extrusion device 3, so that the severing element 16 associated with that transport element 11 severs a multi-layer dose 2 from the multi-layer structure. In particular, when a portion of the multi-layer structure has completely left the exit mouth 18, having a length equal to the length of the multi-layer dose 2 that is to be obtained, the severing element 16 cuts the multi-layer dose 2, which is collected by the transport element 11. The latter collects the multi-layer dose 2 while it is laterally facing the multi-layer dose 2, already completely defined.

The multi-layer dose 2, which is arranged in its initial orientation, adheres to the transport surface 12 of the transport element 11 in question. The transport element 11 continues to move about the rotation axis R, bringing the multi-layer dose 2 towards the release position Q2. After transporting the multi-layer dose 2 along a significant section of its path, the transport element 11 is rotated with respect to the central body 13 by the arrangement for modifying the orientation, so as to modify the orientation of the multi-layer dose 2 until the multi-layer dose 2 is arranged in the final orientation, which happens in the release position Q2. The multi-layer dose 2 is now positioned so that the secondary layer 5 is arranged transversally, in particular, perpendicularly, to the moulding direction Y. The multi-layer dose 2 is thus released into the mould 7, which at this moment is in the open position P1, so as to be received in the cavity 10 of the female element 8. Subsequently, the female element 8 and the male element 9 move closer to one another until they reach the closed position P2 so as to obtain the formed object. The mould 7 can now be opened to remove the formed object from it and insert within it a new multi-layer dose 2.

In a version not shown, the severing arrangement may be conformed differently from what has been described up to now. In particular, the severing arrangement may comprise a thread, or one or more knives, which are distinct from the transport elements 11, i.e. not assembled onto the latter. The severing arrangement may comprise, in an alternative version, one or more blades independently from the transport elements 11. Although in the appended Figures the co-extrusion device 3 has always been represented as extending along a substantially vertical axis, it is also possible to use co-extrusion devices 3 arranged according to other conformations. For example, the co-extrusion device could extend along a substantially horizontal direction, and be provided, in proximity to the exit mouth, with a deviator element that deviates the multi-layer structure, so that the later exits along an exit direction X which, for example, may be substantially vertical.

In a version not shown, the exit direction X may be substantially horizontal, while the moulding direction Y may be substantially vertical. The arrangement for modifying the orientation is in this case configured to modify the orientation of the dose, making the latter perform a 180° rotation.

In a version not shown, the transport elements 11 may comprise a pair of lateral containment walls that project at the two sides of the transport surface 11 to laterally contain the multi-layer doses 2 and retain them more easily.

In a version not shown, the apparatus 1 may be used to compression mould multi-layer gaskets within already formed caps, according to the technique known as puttying. In this case, the female element 8 may be substituted by a mould element having the function of supporting the already formed cap during the moulding of the gasket.

The multi-layer structure may also have different geometries from the flat geometry described up to now. For example, the multi-layer structure could have a curved conformation, so as to obtain multi-layer doses delimited at least partially by curved surfaces.

In an alternative version, the apparatus 1 may be conformed for processing doses conformed like laminar elements, made with a single material, i.e. not having a multi-layer structure.

In any case, the apparatus 1 previously described allows the multi-layer doses 2 to be deposited in the cavity 10 with an orientation that makes it easier to uniformly distribute the material of the secondary layer 5 within the mould 7. The dose, whether it is multi-layer or not, is firmly inserted into the cavity 10. Furthermore, the transport elements 11 ensure that the dose is deformed in a limited way, or is not deformed at all, during the path which goes from the co-extrusion device 3 to the mould 7, which makes it easier, subsequently, to compression mould the doses and increases the quality of the objects produced.

In an alternative version, the arrangement for modifying the orientation, which modifies the orientation of the multi-layer dose during transport, may be used in combination with a moulding carousel which operates intermittently rather than continuously, i.e. in combination with a moulding carousel that rotates in steps about its own axis. It is also possible to use the arrangement for modifying the orientation, which modifies the orientation of the multi-layer dose during transport, in combination with a plurality of moulds which, rather than being supported by a carousel, are movable along a linear path during moulding.

The invention claimed is:

1. An apparatus comprising:
    a co-extrusion device for extruding a multi-layer structure having at least one primary layer and at least one secondary layer, so that the multi-layer structure leaves the co-extrusion device along an exit direction;
    a mould provided with a pair of elements, at least one of said elements being movable towards the other in a moulding direction, so as to compression mould an object from a multi-layer dose which was severed from the multi-layer structure;
    a transport device for carrying the dose towards the mould, the transport device comprising a plurality of transport elements, each transport element being movable along a path directed from a collecting position, in which the dose is collected by the transport element, towards a release position, in which the dose is released into the mould by the transport element interposed between the pair of elements of the moulds, the transport element having a transport surface for coming into contact with the dose, whereby the dose remains adherent to the transport surface from the collecting position to the release position along said path;
    an arrangement for modifying orientation of the dose configured to rotate the dose from an initial orientation, in which the secondary layer extends substantially parallel to the exit direction, to an orientation in which the secondary layer extends transversely to the moulding direction by rotating each transport element about an axis while the dose is being transported by the transport element along said path, so that the dose is introduced into the mould with the orientation in which the secondary layer extends transversely to the moulding direction.

2. An apparatus according to claim 1, wherein the arrangement for modifying orientation of the dose is configured so that the dose is released into the mould with an orientation in which the secondary layer is substantially perpendicular to the moulding direction.

3. An apparatus according to claim 1, wherein the co-extrusion device has an exit mouth which is conformed as a slit for dispensing a flat multi-layer structure, whereby multi-layer doses which are shaped as flat laminar elements can be severed from the flat multi-layer structure.

4. An apparatus according to claim 1, wherein the arrangement for modifying orientation of the dose is configured to modify orientation of the dose in the second half of the path which goes from the collecting position to the release position.

5. An apparatus according to claim 1, wherein the transport device comprises a central body supporting the plurality of transport elements, the central body being rotatable about a rotation axis for moving the transport elements from the collecting position to the release position.

6. An apparatus according to claim 5, wherein said rotation axis is substantially parallel to the moulding direction.

7. An apparatus according to claim 5, wherein each transport element is connected to an arm supported by the central body, the arrangement for modifying orientation of the dose being configured to rotate each transport element about an axis of the corresponding arm, so as to modify orientation of the dose.

8. An apparatus according to claim 1, wherein said transport surface is flat.

9. An apparatus according to claim 8, wherein the transport surface has an area greater than an area of a face the dose intended to be in contact the transport surface during the path from the collecting position to the release position, in order to minimize deformation of the dose during transport.

10. An apparatus according to claim 1, wherein a blade is connected to said at least one transport element, so as to sever the dose from said structure.

11. An apparatus according to claim 1, wherein said mould is included in a plurality of moulds supported by a carousel, said carousel being rotatable continuously or intermittently about an axis.

12. An apparatus according to claim 1, wherein said mould is included in a plurality of moulds movable along a linear path.

13. An apparatus comprising:
    a dispensing device having an exit mouth which is conformed as a slit for dispensing a continuous flat structure from which a laminar dose can be severed;
    a mould provided with a pair of elements, at least one of said elements being movable towards the other in a moulding direction, so as to compression mould an object from the dose;
    a transport device for carrying the dose towards the mould, the transport device comprising at least one transport element which is movable along a path directed from a collecting position, in which the dose is collected by the transport element, towards a release position, in which the dose is released into the mould by the transport element interposed between the pair of elements of the mould, the transport element having a transport surface for coming into contact with the dose, whereby the dose remains adherent to the transport surface from the collecting position to the release position along said path;
    an arrangement for modifying orientation of the dose by rotating the transport element about an axis while the dose is being transported by the transport device along said path, so that the dose is introduced into the mould while the dose is lying in a plane arranged transversely to the moulding direction, the arrangement for modifying orientation of the dose being configured to rotate the dose from an initial orientation, in which the dose is lying in a plane substantially parallel to the exit direction, up to reaching the orientation in which the dose is lying in the plane arranged transversely to the moulding direction.

* * * * *